United States Patent
Teshima

(10) Patent No.: US 9,355,343 B2
(45) Date of Patent: May 31, 2016

(54) IMAGE FORMING APPARATUS AND IMAGE FORMATION METHOD ALLOWING FOR QUICK ACTUAL START FOR PRINTING DOCUMENT DESCRIBED BY PAGE DESCRIBING LANGUAGE

(71) Applicant: KYOCERA Document Solutions Inc., Osaka (JP)

(72) Inventor: Kentaro Teshima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/696,077

(22) Filed: Apr. 24, 2015

(65) Prior Publication Data

US 2015/0310321 A1    Oct. 29, 2015

(30) Foreign Application Priority Data

Apr. 24, 2014  (JP) .................................. 2014-090156

(51) Int. Cl.
G06K 15/00    (2006.01)
G06K 15/02    (2006.01)

(52) U.S. Cl.
CPC .......... G06K 15/406 (2013.01); G06K 15/1817 (2013.01)

(58) Field of Classification Search
USPC ........................ 358/1.15, 1.16, 404, 444, 1.14
See application file for complete search history.

(56) References Cited

U.S. PATENT DOCUMENTS

2005/0057771 A1*  3/2005  Ohishi ............... H04N 1/00204
                                                        358/1.15
2013/0191623 A1*  7/2013  Yamashita ............ G06F 9/4401
                                                        713/2

FOREIGN PATENT DOCUMENTS

JP    2009-229747 A    10/2009

* cited by examiner

Primary Examiner — Jerome Grant, II
(74) Attorney, Agent, or Firm — Hawaii Patent Services; Nathaniel K. Fedde

(57) ABSTRACT

To provide an image forming device that allows for quick actual start for printing a document described by a page describing language even while an auxiliary storage device such as an HDD is in an unmount state in sleep mode or the like. A main controller checks, in sleep mode, for a mount state of the auxiliary storage device, upon receipt of a request from an external device to process for printing a document described by a page describing language. Then, the main controller, upon judgement of the mount state of the auxiliary storage device, controls for storing printing data set related to the printing document temporally in the auxiliary storage device. On the contrary, the main controller, upon judgement of the unmount state of the auxiliary storage device, controls for storing the printing data set in a random access memory.

8 Claims, 3 Drawing Sheets

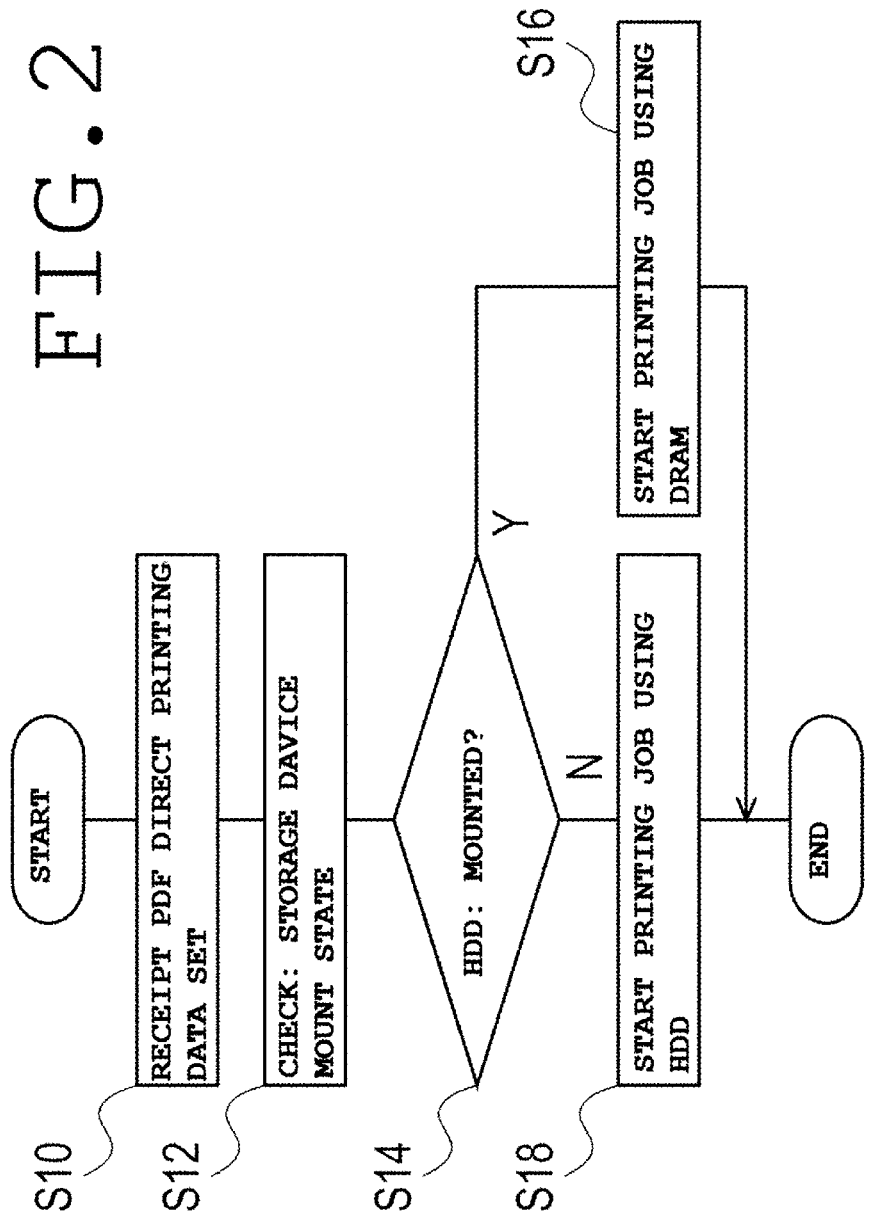

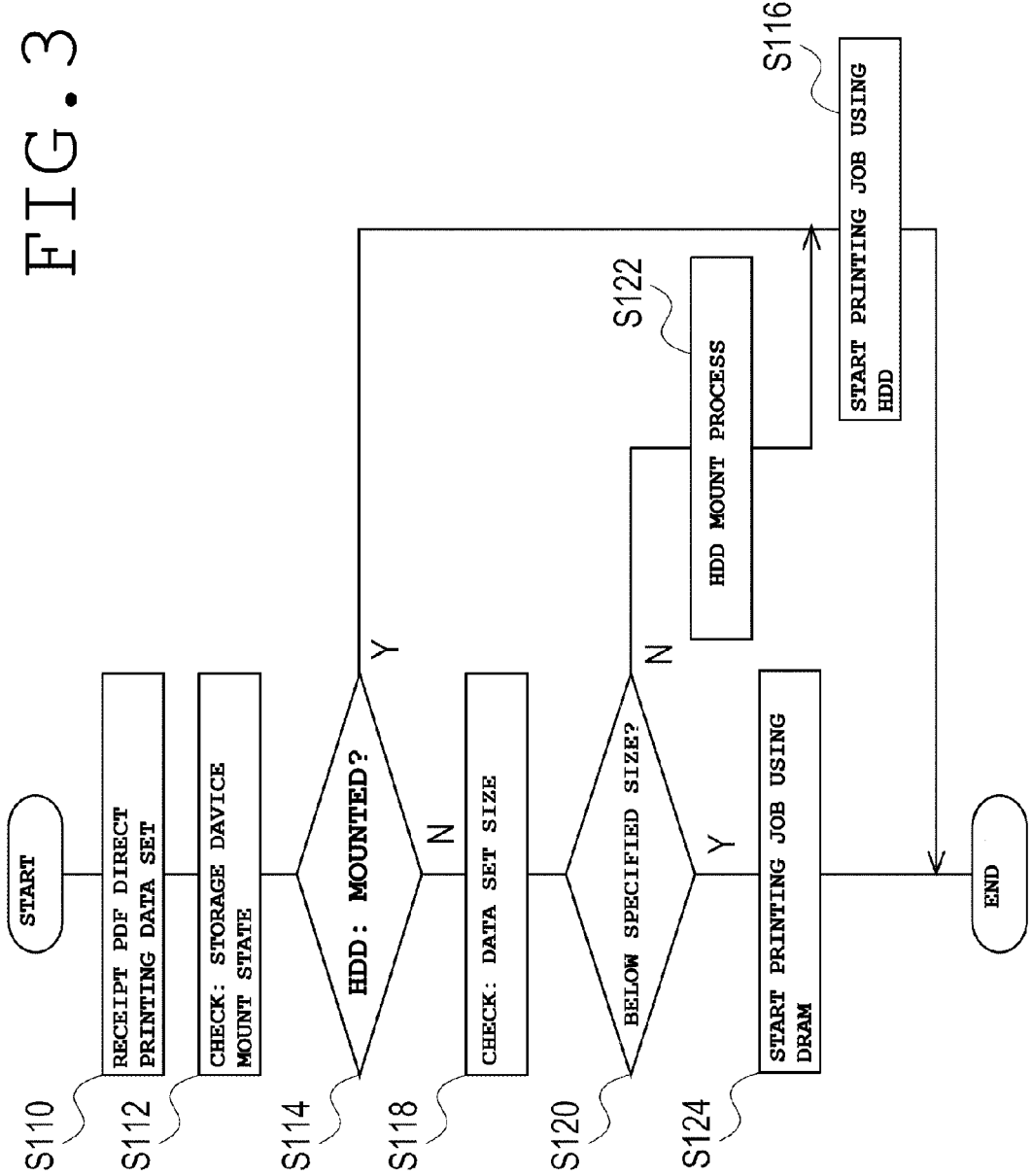

IMAGE FORMING APPARATUS AND IMAGE FORMATION METHOD ALLOWING FOR QUICK ACTUAL START FOR PRINTING DOCUMENT DESCRIBED BY PAGE DESCRIBING LANGUAGE

INCORPORATION BY REFERENCE

This application is based on and claims the benefit of priority from Japanese Patent Application No. 2014-090156 filed on Apr. 24, 2014, the contents of which are hereby incorporated by reference.

BACKGROUND

The present disclosure relates to an image forming apparatus and an image formation method. In particular, the present disclosure relates an image forming apparatus and an image formation method both of which have a sleep mode (sleep function).

Some image forming apparatuses are provided with a large capacity storage device such as a HDD (Hard disk drive). Recent years, technologies for suppressing power consumption of the HDD have been proposed for and introduced in such image forming apparatuses. This is for reducing the power consumption of the entire image forming apparatus.

In a typical technology, upon request for printing image data set in power saving mode, a judgement is made whether the data size of the image data set is allowed to be stored in a DRAM. If the result of the judgment is positive, a printing process is executed without recovering from a power saving mode.

SUMMARY

An image forming apparatus of the present disclosure has a sleep function. The image forming apparatus includes a mount state judging part and a printing data temporary storage control part. The mounting state judging part judges, in sleep mode, for a mount state of an auxiliary storage device upon receipt of a request from an external device to process for printing a document described by page describing language. The printing data set temporary storage control part controls, upon judgement of the mount state of the auxiliary storage device, for storing printing data set related to the printing document temporally in the auxiliary storage device. In addition, the printing data set temporary storage control part controls, upon judgement of the unmount state of the auxiliary storage device, for storing the printing data temporally in a random access memory.

An image forming apparatus of the present disclosure has a sleep function. This image forming apparatus includes a mounting state judging part and a printing data temporary storage control part. The mounting state judging part judges, in sleep mode, for a mount state of an auxiliary storage device upon receipt of a request from an external device to process for printing a document described by page describing language. The printing data temporary storage control part controls, upon judgement of the mount state of the auxiliary storage device, for storing printing data set related to the printing document temporally in the auxiliary storage device. On the other hand, the printing data set temporary storage control part controls, upon judgement of the unmount state of the auxiliary storage device, for storing the printing data set temporally in the auxiliary storage device after an establishment of the mount state of the auxiliary storage device on a condition that a data size of the printing data set is found to be greater than a specified size. In addition, the printing data set temporary storage control part controls, for storing the printing data set in a random access memory temporally on a condition that the data size of the printing data set is not greater than the specified size.

An image forming method of the present disclosure is executed by an image forming apparatus that has a sleep function. The present method judges, in sleep mode, for a mount state of an auxiliary storage device upon receipt of a request from an external device to process for printing a document described by page describing language. In addition, the present method controls, upon judgement of the mount state of the auxiliary storage device, for storing printing data set related to the printing document temporally in the auxiliary storage device. Further, the present method controls upon judgement of the unmount state of the auxiliary storage device, for storing the printing data set temporally in a random access memory.

BRIEF DESCRIPTION OF THE DRAWINGS

FIG. 2 is a flow chart of a process according to an embodiment of the present disclosure which performs a direct PDF printing; and FIG. 3 is a flow chart of a process according to a modification of the embodiment of the present disclosure which performs a direct PDF printing.

DETAILED DESCRIPTION

Figure 1:
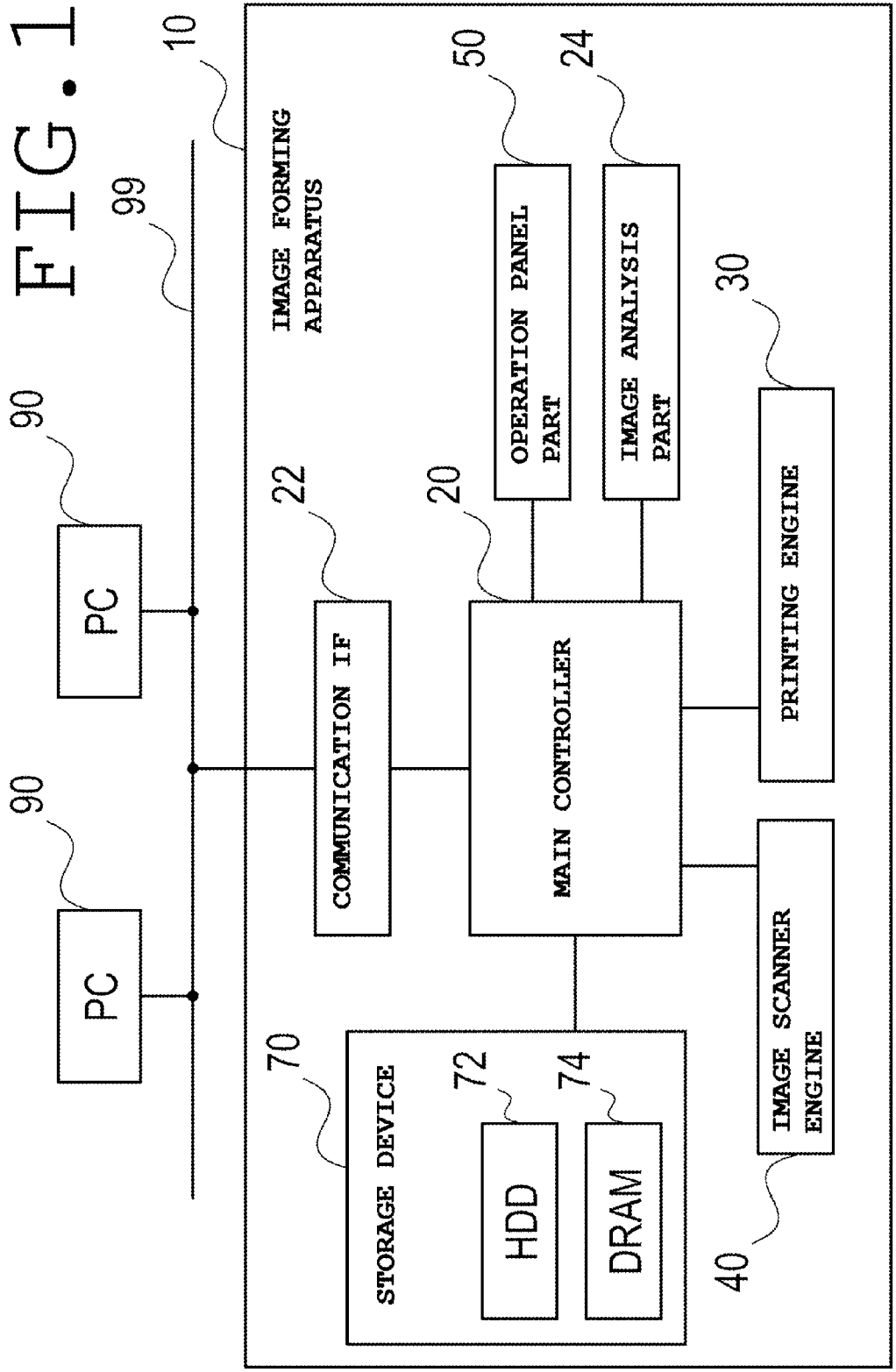
FIG. 1 is a functional block diagram that illustrates a configuration of an image forming apparatus according to an embodiment of the present disclosure.

Hereinafter, embodiments of the present disclosure will be described with reference to the drawings. An outline of the present embodiment is as follows. That is, the present embodiment performs document printing of Page Description Languages, such as a direct PDF (Portable Document Format) printing and an XPS (XML Paper Specification) printing. The present embodiment has a logic routine to verify a state of a device condition, when verified by the image analysis part (interpreter). At this time, a temporal storage destination is determined. In addition, a printing data includes a file size, a comparison is made between a memory residual quantity in the main body and the data file size as a size required for storing the printing data. On the basis of the result of this comparison, a device as the storage destination is determined. It is to be noted that hereinbelow a direct PDF printing will be exemplified as a document printing of Page Description Language.

FIG. 1 is a functional block diagram that illustrates a schematic configuration of an image forming apparatus according to an embodiment of the present disclosure. Here, this illustration is made by mainly focusing on the function that is executed for the process about a direct PDF printing.

An image forming apparatus 10 is, for example, takes a form of a printer or a multifunction peripheral. The image forming apparatus 10 includes a main controller 20, a printing engine 30, an image scanner engine 40, an operation panel part 50, a storage device 70, a communication interface 22, and an image analysis part 24.

The main controller 20 (a control part, a mount state determining part, and a temporal printing-data storage control part) is made up of, for example, a CPU, a non-temporal recording medium, and other elements. The main controller 20 comprehensively controls each component of the image forming apparatus 10.

The communication interface 22 is an interface based on a specific telecommunications standard. The communication interface 22 is connected with PC (personal computer) via a network 99.

The image analysis part 24 creates an image data set based on a printing data acquired from PC 90 via the main controller 20. In addition, the image analysis part 24 analyzes an image content of each created page. Further, the image analysis part 24 determines a fixing temperature in the printing engine 30. It is to be noted that the image analysis part 24 specifies, in a case of printing job of a Page Description Language, the print position and character type of a character by using commands. Thereby, the image analysis part 24 causes a printer to interpret the specified print position and character type for printing.

The printing engine 30 includes, for example, an engine control part, an image forming part, a fixing control part, and a fixing assembly. The printing engine 30 forms a toner image on an actual paper based on an image data set that is generated by the image analysis part 24. Then, the printing engine 30 causes the fixing assembly to heat and press the toner image for fixing the toner image on the paper.

The image scanner engine 40 reads a manuscript that has been set on a specific manuscript stand (not shown) and generates an image data set of the manuscript.

The operation panel part 50 includes various operation keys and touch panels, such as a numeric keypad, a start key, and a power key. The operation panel part 50 accepts a user's operation instruction, and notifies the same to the main controller 20. In response to the operation instruction, the main controller 20 performs a corresponding process.

The storage device 70 is provided with a HDD 72 and a DRAM 74. The HDD 72 is a storage device that records and reads information by accessing a magnetic head to a rotating disk at a high speed on which a magnetic substance has been applied. Here, the HDD 72 operates as an auxiliary storage device. The main controller 20 memorizes and comprehends a mount state of the HDD 72 as a specified state. It is to be noted that other than the HDD 72, drive devices that achieve the same function as that of the HDD 72 are also available, the drive devices including, for example, a memory card and an SSD (Solid State Drive). A DRAM 74 is a kind of volatile memory. The DRAM 74 has a function to operate as a working space for various programs that the main controller 20 executes. In addition, the DRAM 74, under specific conditions, acts as a temporal storage region for the image data set, or a RAM disk mode region. Further, the DRAM 74 acts as a working region.

A flow chart in FIG. 2 illustrates a process of the PDF direct printing by the image forming apparatus 10. FIG. 2 has an attention to a process when printing data set is received especially in a sleep state. Similar to the above description, when the state of the image forming apparatus 10 is a sleep state, the devices including, for example, the HDD 72 are in an unmount state. This is for the purpose of saving electric power. In PDF direct printing, printing data set (print file) is stored temporally in a device such as the HDD 72. Thereafter, the image analysis part 24 as an interpreter starts a process to execute. Therefore, the longer a time required for performing a process of mounting the HDD 72 or the like to be mount process, the later a printing start.

In light of the above, upon starting of the PDF direct printing in sleep mode, mount states of the HDD 72 and other devices are verified. At this time, if the results indicate mount states, the data set is transferred to the DRAM 74 for the printing process. That is to say, for the printing process, the DRAM 74 is brought into function under RAM disk mode. Thereby, the printing starting is quickened.

In detail, first of all, under sleep state, the main controller 20 is in receipt of the printing data set of the PDF direct printing from the PC 90 via the network 99 and the communication interface 22 (S10). The main controller 20 references to the setup information and the like that are recorded or stored on the HDD 72 in order to verify for a mount state (S12).

If the HDD 72 is mounted ("Y" of S14), the main controller 20 will start a printing job by using the HDD 72 (S16). That is, the main controller 20 stores temporarily all the printing data set from the PC 90 on the HDD 72. Thereafter, the controller 20 causes the image analysis part 24 to execute an analysis process and other similar jobs.

If the HDD 72 is not mounted ("N" of S14), the main controller 20 starts the printing process by using the DRAM 74 (S18). That is, the main controller 20 stores temporarily all the printing data sets from the PC 90 on the HDD 74. Thereafter, the controller 20 causes the image analysis part 24 to execute an analysis process and other similar jobs. It is to be noted that the mount process of the HDD 72 may be accomplished in parallel with the process of the DRAM 74. In this case, if the process using the DRAM 74 is not in completion or is not advancing, the printing data set received may be transferred to the HDD 72 after the mount process of the HDD 72 has been completed.

As mentioned above, according to the present embodiment, even if the auxiliary storage device such as the HDD 72 is in the unmount state in sleep mode or the like, it is possible to realize a quick actual start for printing a document described by Page Description Language.

The flow chart of FIG. 3 is a modification of the process illustrated by the flow chart of FIG. 2. Like FIG. 2, FIG. 3 illustrates a PDF direct printing by the image forming apparatus 10. A focus is made on the process upon receipt of the printing data set in sleep mode.

More specifically, at first, under sleep state, the main controller 20 is in receipt of the printing data set of the PDF direct printing from the PC 90 via the network 99 and the communication interface 22 (S110). Then, the main controller 20 references to the setup information and the like that are recorded or stored on the HDD 72 in order to verify for a mount state (S112).

If the HDD 72 is mounted ("Y" of S114), the main controller 20 will start a printing job by using the HDD 72 (S116).

If the HDD 72 is not mounted ("N" of S114), the main controller 20 verifies a data size of the printing data set from the PC 90 (S118). Sometimes the printing data set is indicated at its specific region with a data size. In such a case, the main controller 20 is allowed to verify the data size.

In a case where the data size is larger than a specific size or the data size is unknown ("N" of S120), the main controller 20 executes the mount process of the HDD 72 (S122). The main controller 20 starts a printing job, after the completion of the mount, using the HDD 72 (S116).

In a case where the data size is below the specific size ("Y" of S120), the main controller 20 starts the printing job by using the DRAM 74 (S124).

As mentioned above, according to the present modification, an effect is provided that is similar to the effect by the aforementioned embodiment. In addition, the present modification is of a function to verify the data size of the printing data set previously. Thus, it is possible to avoid a re-execution of the processing or the like after completion of the mounting process of the HDD 72 which results from a capacity shortage of the DRAM 74.

More specifically, in document printing of Page Description Languages, such as direct PDF printing and an XPS printing, at first, all the data sets are temporally stored in the storage device of the apparatus. Then, a data analysis is performed for generating drawing object.

Typically, the rated capacity of the DRAM of an image forming apparatus is not sufficient but necessary and thus the HDD and the like have to be recovered from sleep mode before an execution of the direct PDF printing or the like. However, in sleep mode, the storage device such as the HDD or the like is unmount, which will bring a long time for recovering devices. Therefore, a start of printing will be late upon a direct PDF printing. Thus, a technology has been requested that improves such a drawback.

On the other hand, according to the embodiments of the present disclosure, it is possible to provide a technology that allows for quick actual start for printing a document described by page describing language even while an auxiliary storage device such as a HDD is in an unmount state in sleep mode or the like.

In the above, the present disclosure is set forth in term of a number of exemplary embodiments. However, those skilled in the art will understand that these embodiments are exemplary and various modifications may be possible by different combination of each element of the embodiments. In addition, those skilled in the art will readily understand that such modifications fall within the scope of the present disclosure.

What is claimed is:

1. An image forming device with a sleep function, comprising:
   a main controller including a CPU that controls each component of the image forming device;
   an auxiliary storage device that includes a hard disk drive (HDD), a memory card, or a Solid State Drive (SSD); wherein the auxiliary device can be in a mount state and wherein the auxiliary device can be an unmount state, and
   a random access memory,
   the main controller comprising:
   a mounting state judging part that determines, in a sleep mode of the image forming apparatus, a state of the auxiliary storage device upon receipt of a request from an external device to process for printing a document comprising printing data described by a page description language, wherein:
   the determined state of the auxiliary device can be the mount state or the unmount state,
   the page description language is a direct Portable Document Format (PDF) printing, and
   in the direct PDF printing, all the printing data are temporally stored in a storage device of the image forming apparatus, and then data analysis is performed for generating a drawing object; and
   a printing data temporary storage control part that controls the image forming apparatus to:
   i) upon said determination of the state of the auxiliary storage device being the mount state, store the printing data temporally in the auxiliary storage device, and
   ii) upon said determination of the state of the auxiliary storage device being the unmount state, store the printing data temporally in random access memory.

2. The image forming apparatus of claim 1, wherein the random access memory is DRAM.

3. An image forming device with a sleep function, comprising:
   a main controller including a CPU that controls each component of the image forming device;
   an auxiliary storage device that includes a hard disk drive (HDD), a memory card, or a Solid State Drive (SSD), wherein the auxiliary device can be in a mount state and wherein the auxiliary device can be an unmount state; and
   a random access memory,
   the main controller comprising:
   1) a mounting state judging part that determines, in a sleep mode of the image forming apparatus, a state of the auxiliary storage device upon receipt of a request from an external device to process for printing a document comprising printing data described by a page description language, wherein:
   the determined state of the auxiliary device can be the mount state or the unmount state,
   the page description language is a direct Portable Document Format (PDF) printing, and
   in the direct PDF printing, all the printing data are temporally stored in a storage device of the image forming apparatus, and then data analysis is performed for generating a drawing object; and
   a printing data temporary storage control part that controls the image forming apparatus to:
   i) upon said determination of the state of the auxiliary storage device being the mount state, store the printing data temporally in the auxiliary storage device, and
   ii) upon said determination of the state of the auxiliary storage device being the unmount state, determine a condition of the data size of the printing data, wherein:
   a) if the condition of the data size is found to be a first condition, the printing data is stored temporally in the auxiliary storage device after establishing the mount state of the auxiliary storage device, wherein the first condition is that the data size of the printing data is greater than a specified size, and
   b) if the condition of the data size is found to be a second condition, the printing data is stored in the random access memory temporally, wherein the second condition is that the data size of the printing data is not greater than the specified size.

4. The image forming apparatus of claim 3, wherein the random access memory is DRAM.

5. An image forming method that is executed by an image forming device with a sleep function,
   wherein the image forming device includes:
   a main controller including a CPU that controls each component of the image forming device;
   an auxiliary storage device that includes a hard disk drive (HDD), a memory card, or a Solid State Drive (SSD), wherein the auxiliary device can be in a mount state and wherein the auxiliary device can be an unmount state; and
   a random access memory,
   the method comprising, via the main controller:
   determining, in a sleep mode of the image forming apparatus, a state of the auxiliary storage device upon receipt of a request from an external device to process for printing a document comprising printing data described by a page describing language, wherein:

the determined state of the auxiliary device can be the mount state or the unmount state, the page description language is a direct Portable Document Format (PDF) printing, and in the direct PDF printing, all the printing data are temporally stored in a storage device of the image forming apparatus, and then data analysis is performed for generating a drawing object;

controlling, upon said determination of the state of the auxiliary storage device being the mount state, the image forming apparatus for storing the printing data temporally in the auxiliary storage device; and controlling, upon said determination of the state of the auxiliary storage device being the unmount state, the image forming apparatus for storing the printing data temporally in the random access memory.

6. The image forming method of claim 5, wherein the random access memory is DRAM.

7. An image forming method that is executed by an image forming device with a sleep function, wherein the image forming device includes:

a main controller including a CPU that controls each component of the image forming device;

an auxiliary storage device that includes a hard disk drive (HDD), a memory card, or a Solid State Drive (SSD), wherein the auxiliary device can be in a mount state and wherein the auxiliary device can be an unmount state; and a random access memory, the image forming method comprising, via the main controller:

determining, in a sleep mode of the image forming apparatus, the state of the auxiliary storage device upon receipt of a request from an external device to process for printing a document comprising printing data described by a page describing language, wherein:

the determined state of the auxiliary device can be the mount state or the unmount state, the page description language is a direct Portable Document Format (PDF) printing, and in the direct PDF printing, all the printing data are temporally stored in a storage device of the image forming apparatus, and then data analysis is performed for generating a drawing object;

controlling, upon said determination of the state of the auxiliary storage device being the mount state, the image forming apparatus for storing the printing data set temporally in the auxiliary storage device;

controlling, upon said determination of the state of the auxiliary storage device being the unmount state, the image forming apparatus for determining a condition of the data size of the printing data;

controlling, if the condition of the data size is found to be a first condition, the image forming apparatus for storing the printing data temporally in the auxiliary storage device after establishing the mount state of the auxiliary storage device, wherein first condition is that the data size of the printing data is be greater than a specified size; and controlling, if the condition of the data size is found to be a second condition, the image forming apparatus for storing the printing data temporally in the random access memory, wherein the second condition is that the data size of the printing data is not greater than the specified size.

8. The image forming method of claim 7, wherein the random access memory is DRAM.

* * * * *